Patented May 13, 1952

2,596,930

UNITED STATES PATENT OFFICE 2,596,930

SYNTHETIC RESINS PREPARED FROM BIGUANIDE - ALDEHYDE CONDENSATION PRODUCTS

Donald W. Kaiser, Riverside, Conn., assignor to American Cyanamid Company, New York, N. Y., a corporation of Maine No Drawing. Application October 16, 1946, Serial No. 703,481

10 Claims. (Cl. 210—24)

This invention relates to resins suitable for the removal of anions from liquids, to processes of preparing such anion exchange resins, and to processes of purifying liquids by means of such resins.

It is an object of the present invention to provide a resinous material which is insoluble in water and which is suitable for removing anions from water and other liquid media.

It is a further object of the present invention to provide a process for the preparation of water-insoluble anion active resinous materials.

These and other objects are attained by condensing a biguanide with a reactive carbonyl compound such as an aldehyde having more than one carbon atom or a ketone, and resinifying the resulting condensation product with an aldehyde.

Still another object of the present invention is to provide an improved process for removing anions from, or exchanging anions in, liquids.

These and other objects are attained by contacting a liquid containing anions with a granular water-insoluble anion exchange resin of the present invention.

The invention will be described in greater detail in conjunction with the following specific examples in which the proportions are given in parts by weight unless otherwise indicated. The examples are merely illustrative, and it is not intended that the scope of the invention be limited to the details therein set forth.

EXAMPLE 1

*Condensation of biguanide with salicylaldehyde*

110 parts of biguanide (1.1 mols)
122 parts of salicylaldehyde (1.0 mol)
475 parts of methanol A solution of the biguanide in the methanol is mixed with the salicylaldehyde. The mixture becomes warm, and a yellow solid which is probably the biguanide salt of salicylaldehyde because it is very soluble in water, is precipitated from the solution. After standing for five weeks the yellow solid which is no longer soluble in water is filtered, washed with water, and allowed to dry. 192 parts of an amorphous tan solid which melts at 247° C., is soluble in acids and alkalis and is insoluble in water is obtained.

*Resinification of the condensation product of salicylaldehyde and biguanide*

50 parts of the condensation product prepared as indicated above (0.25 mol)
75 parts of 37% formalin (0.94 mol)

A mixture of the condensation product and the formalin is stirred and heated to reflux temperature whereupon a deep brown solution results. It is heated for 20 minutes and then several drops of a 1% solution of dimethyl dihydrogen pyrophosphate in butanol are added. Within 5 minutes the mixture sets to a tan, rubber-like solid which, after cooling, becomes hard and brittle.

The resin is ground and dried in an oven at 110° C. for 1½ hours. 60 parts of an infusible brown product which is insoluble in water, alcohol, acid, and alkali of comparable strength to that of boiling sodium carbonate solution are obtained.

Upon evaluation the resin is found to have a capacity for removing anions from solution.

While I do not wish to be limited to any particular theory of mechanism of the reaction which occurs in the formation of the resin intermediate from salicylaldehyde and biguanide, I believe that one or both of two possible reactions occurs.

Either the reaction is similar to that of the formation of hydrazones, oximes, and semi-carbazones which may be represented as follows for the reactants of Example 1:

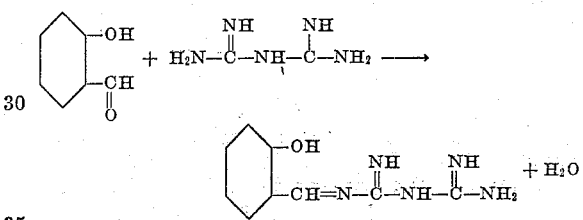

or cyclization takes place resulting in the formation of a dihydroguanamine according to the equation

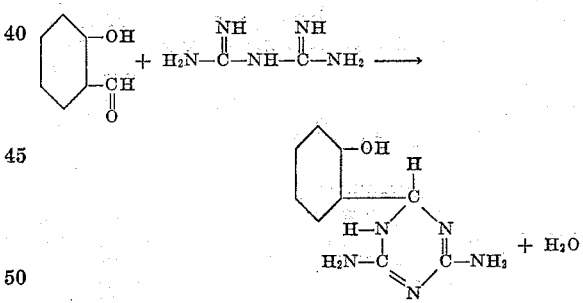

Evidence seems to support this latter theory as the most likely mechanism, but the invention is in no sense limited to any particular theory of mechanism of reaction. Since a cyclic product may be obtained by cyclization of a straight chain compound formed according to the first proposed theory of mechanism of reaction or directly by reaction of one hydrogen atom from each of the two amino groups with the oxygen of the aldehyde, biguanide and mono- and di-substituted biguanides are preferred for use in the present invention.

EXAMPLE 2

*Condensation of biguanide with cyclohexanone*

36 parts of biguanide (0.36 mol)
150 parts of cyclohexanone (1.5 mols)

The materials are heated for ½ hour at 140° C. during which time 8 parts (0.4 mol) of water are formed. The exothermic reaction proceeds rapidly and the product, which is soluble in water and ethanol, solidifies.

*Resinification of the condensation product of biguanide and cyclohexanone*

181 parts of the condensation product prepared as indicated above (1.0 mol)
162 parts of 37% formalin (2.0 mols as formaldehyde)

An exothermic reaction sets in immediately upon mixing these two compounds to form a tough mass which turns brittle on cooling. The resin is white, insoluble in acid, alkali and water, and cured by the heat of reaction. It is found to have a capacity for the removal of anions from solution.

While I do not wish to be limited to any particular theory of mechanism of reaction, I believe that the following takes place when biguanide and cyclohexanone are condensed. Since one mol of biguanide reacts with but one mol of cyclohexanone, the reaction may be represented as follows:

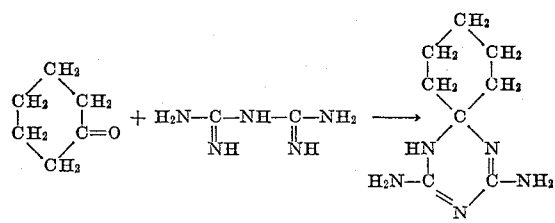

and a dihydroguanamine is produced.

Other reactive carbonyl compounds may be condensed with biguanide to form a resin intermediate for the present invention. Aldehydes having more than one carbon atom, i. e. from 2 to 10 carbon atoms, such as p-aminobenzaldehyde, p - dimethylaminobenzaldehyde, acetaldehyde, heptaldehyde, acrolein, crotonaldehyde, cuminaldehyde, etc., may be substituted for the salicylaldehyde, benzaldehyde and furfural of the examples. Moreover, reactive ketones having 3 to 9 carbon atoms such as acetone, mesityl oxide, acetylacetone, acetonylacetone, methyl ethyl ketone, acetophenone, phorone, isophorone, cyclopentanone, etc., may also be used.

Substituted biguanides may be condensed with any of the foregoing aldehydes or ketones just as biguanide itself may. Examples of suitable mono- and di-substituted biguanides are phenyl biguanide, N,N'-diphenyl biguanide, N,N-diphenyl biguanide, octadecyl biguanide, N,N- and N,N'-dioctadecyl biguanides, monobenzyl biguanide, N,N-dibenzyl and N,N'-dibenzyl biguanides, N - ethyl - N' - benzyl biguanide, monofurfuryl biguanide, N,N'-difurfuryl- and N,N-difurfuryl biguanides, monoethyl biguanide, N,N-diethyl and N,N'-diethyl biguanides, butyl biguanide, isobutyl biguanide, tert. butyl biguanide and the corresponding N,N'- and N,N-dibutyl biguanides, octyl biguanide, N,N- and N,N'-dioctyl biguanides, etc. The corresponding salts such as the carbonates, acetates, etc., of the biguanides, for example, phenyl biguanide acetate, etc., may also be used.

The condensation product of the biguanides with the reactive carbonyl compounds may be resinified by reaction with at least one aldehyde such as, for example, formaldehyde, acetaldehyde, crotonaldehyde, benzaldehyde, furfural, etc. Moreover, mixtures of one or more of the aldehydes may be utilized. The intermediate condensation products of biguanides and reactive carbonyl compounds, preferably in a molar ratio of 1:1 to 1:2, are monomeric. They are relatively simple organic compounds and not complex polymers.

The final heat treatment or curing or the resins of the present invention is preferably carried out at a temperature of 95°–105° C., although other conditions including temperatures ranging from 50° C. up to about 125° C. or higher may be used.

The anion active resins of the present invention may be activated or regenerated by means of dilute alkaline solutions, such as for example, 0.1–25% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations) and organic acids such as acetic acid, oxalic acid, etc., from water and organic liquids. The anions of salts such as the chloride ion of ammonium chloride or the sulfate ion of ammonium sulfate may be removed by means of the resinous products described herein.

The anion active resins are useful for many purposes examples of which are the removal of acid from water, the removal of acid from alcoholic solutions, the purification of sugar juices, treatment of sugar solutions in general, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, resins should have a sufficiently low solubility that they will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

The terms "reactive ketone," "reactive aldehyde," and "reactive carbonyl compound," as used in the present specification and claims, is intended to cover those carbonyl compounds which will react with a biguanide to form a monomeric condensation product which may be resinified by further treatment with an aldehyde.

I claim:

1. A water-insoluble, granular, anion active synthetic resinous material obtained by bringing about reaction between formaldehyde, as the sole aldehyde, and the monomeric organic heat condensation product of a member of the group consisting of biguanide, mono- and di-monovalent hydrocarbon- and furfuryl-substituted biguanides, and their salts with a carbonyl compound containing only carbon, hydrogen and oxygen and selected from the group consisting of aldehydes having from 2 to 10 carbon atoms and ketones having from 3 to 9 carbon atoms, permitting the reaction product so obtained to gel, curing the gel by heating, and granulating the cured gel, the relative molar proportions of said member to said carbonyl compound in said condensation product being from 1:1 to 1:2.

2. A water-insoluble, granular, anion active synthetic resinous material obtained by bringing about reaction between formaldehyde, as the sole aldehyde, and the monomeric heat condensation product of a member of the group consisting of biguanide, mono- and di-monovalent hydrocarbon- and furfuryl-substituted biguanides and their salts with an aldehyde containing only carbon, hydrogen and oxygen and having from 2 to 10 carbon atoms, the relative molar proportions of said member to said aldehyde in said condensation product being from 1:1 to 1:2, permitting the reaction product so obtained to gel, curing the gel by heating, and granulating the cured gel.

3. A water-insoluble, granular, anion active synthetic resinous material obtained by bringing about reaction between formaldehyde, as the sole aldehyde, and the monomeric organic heat condensation product of a member of the group consisting of biguanide, mono- and di-monovalent hydrocarbon- and furfuryl-substituted biguanides and their salts with a ketone containing only carbon, hydrogen and oxygen and having from 3 to 9 carbon atoms, the relative molar proportions of said member to said ketone in said condensation product being from 1:1 to 1:2, permitting the reaction product so obtained to gel, curing the gel by heating, and granulating the cured gel.

4. A water-insoluble, granular, anion active synthetic resinous material obtained by bringing about reaction between formaldehyde and the monomeric organic heat condensation product of biguanide with salicylaldehyde in a molar ratio of from 1:1 to 1:2, permitting the reaction product so obtained to gel, curing the gel by heating, and granulating the cured gel.

5. A water-insoluble, granular, anion active synthetic resinous material obtained by bringing about reaction between formaldehyde and the monomeric organic heat condensation product of substantially equimolar quantities of biguanide and salicylaldehyde, permitting the reaction product so obtained to gel, curing the gel by heating, and granulating the cured gel.

6. The process which comprises bringing about reaction between formaldehyde, as the sole aldehyde, and the monomeric organic heat condensation product of a member of the group consisting of biguanide, mono- and di-monovalent hydrocarbon- and furfuryl-substituted biguanides and their salts with a carbonyl compound containing only carbon, hydrogen and oxygen and selected from the group consisting of aldehydes having from 2 to 10 carbon atoms and ketones having from 3 to 9 carbon atoms, the relative molar proportions of said member to said carbonyl compound in said condensation product being from 1:1 to 1:2, permitting the reaction product so obtained to gel, curing the gel by heating, and granulating the cured gel.

7. The process according to claim 6 in which formaldehyde is reacted with the monomeric organic heat condensation product of biguanide and salicylaldehyde.

8. A method for the removal of anions from liquid media which comprises contacting a liquid containing anions with a water-insoluble, granular, anion active synthetic resinous material obtained by the process of claim 6, and separating said liquid from said resin.

9. A method for the removal of anions from aqueous solution which comprises contacting an aqueous solution containing anions with a water-insoluble, granular, anion active synthetic resinous material obtained by the process of claim 6, and separating said liquid from said resin.

10. A method for the removal of anions from water which comprises passing an aqueous medium containing anions through a bed of the water-insoluble, granular anion active synthetic resin of claim 4.

DONALD W. KAISER.

REFERENCES CITED

The following references are of record in the file of this patent:

UNITED STATES PATENTS

| Number | Name | Date |
|---|---|---|
| 1,906,942 | Ter Horst | May 2, 1933 |
| 2,251,234 | Swain | July 29, 1941 |
| 2,259,169 | Little | Oct. 14, 1941 |
| 2,277,480 | D'Alelio | Mar. 24, 1942 |
| 2,285,750 | Swain | June 9, 1942 |
| 2,323,898 | D'Alelio | July 13, 1943 |
| 2,395,825 | Hesler | Mar. 5, 1946 |
| 2,425,320 | Hill | Aug. 12, 1947 |
| 2,515,116 | Dudley | July 11, 1950 |